(12) United States Patent
Kim et al.

(10) Patent No.: US 8,776,540 B2
(45) Date of Patent: *Jul. 15, 2014

(54) SUPERCOOLING APPARATUS

(75) Inventors: Su-Cheong Kim, Changwon-si (KR); Ju-Hyun Kim, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 1129 days.

This patent is subject to a terminal disclaimer.

(21) Appl. No.: 12/677,497

(22) PCT Filed: Sep. 22, 2008

(86) PCT No.: PCT/KR2008/005621
§ 371 (c)(1),
(2), (4) Date: Apr. 7, 2010

(87) PCT Pub. No.: WO2009/038428
PCT Pub. Date: Mar. 26, 2009

(65) Prior Publication Data
US 2011/0005249 A1   Jan. 13, 2011

(30) Foreign Application Priority Data
Sep. 21, 2007   (KR) .......................... 10-2007-0096899

(51) Int. Cl.
*G01K 13/00* (2006.01)
*F25B 41/00* (2006.01)

(52) U.S. Cl.
USPC ............................................. 62/129; 62/208

(58) Field of Classification Search
USPC ............ 62/208, 126, 129, 338, 342, 440, 441
See application file for complete search history.

(56) References Cited

U.S. PATENT DOCUMENTS

| | | | |
|---|---|---|---|
| 7,784,298 B2 | 8/2010 | Ha et al. | |
| 8,151,576 B2 * | 4/2012 | Kim et al. | 62/66 |
| 2001/0009100 A1 | 7/2001 | Ohya et al. | |
| 2003/0068414 A1 * | 4/2003 | Ito | 426/237 |
| 2007/0163286 A1 * | 7/2007 | Lim et al. | 62/389 |
| 2010/0205986 A1 * | 8/2010 | Chung et al. | 62/159 |
| 2010/0229571 A1 * | 9/2010 | Kim et al. | 62/3.1 |
| 2010/0242524 A1 * | 9/2010 | Chung et al. | 62/331 |

FOREIGN PATENT DOCUMENTS

| | | | |
|---|---|---|---|
| JP | 2005034089 A * | 2/2005 | |
| JP | 2006292347 A * | 10/2006 | |
| JP | 2006292347 A * | 10/2006 | |
| JP | 3903065 B1 | 4/2007 | |
| JP | 3950904 B1 | 8/2007 | |
| KR | 10-2007-0075669 A | 7/2007 | |

* cited by examiner

*Primary Examiner* — Chen Wen Jiang
(74) *Attorney, Agent, or Firm* — Birch, Stewart, Kolasch & Birch, LLP

(57) ABSTRACT

A supercooling apparatus of the present invention is capable of regulating a supercooled state for an item at temperatures below a phase transition temperature and adjusting temperature of the item in the supercooled state, wherein the supercooling apparatus comprises a storage space for receiving liquid or a stored item containing liquid; a cooling means for cooling the liquid, the stored item, or the storage space to a temperature below zero; and a temperature regulating means for applying a controlled amount of energy to the liquid, to surface of the stored item, or to gas above the surface, thereby regulating a temperature of the liquid or the stored item below a maximum ice crystal formation temperature zone of the liquid or the stored item. Therefore, the supercooling apparatus can control a supercooling temperature that has the biggest influence on ecological preservation of liquid or a stored item.

18 Claims, 4 Drawing Sheets

SUPERCOOLING APPARATUS

TECHNICAL FIELD

The present invention relates to a supercooling apparatus, and more particularly, to a supercooling apparatus capable of maintaining a supercooled state for an item at temperatures below a phase transition temperature and adjusting temperature of the item in the supercooled state.

BACKGROUND ART

A term "supercooling" describes a phenomenon that melt or solid does not change even after it is cooled down to a temperature lower than the phase transition temperature at equilibrium state. In general, every material has its own stable state at a given temperature, so if temperature changes gradually, atoms of the substance keep abreast with the changes of temperature while maintaining its stable state at each temperature. However, if temperature changes abruptly, there is not enough time for the atoms to get into a stable state corresponding to each temperature. What happens then is the atoms either keep the stable state at a start temperature, or partially change to a state at a predetermined end temperature then stop.

For example, when water is cooled slowly, it does not freeze for some time even though the temperature is below 0° C. However, when an object becomes a supercooled state, it is a sort of metastable state where the unstable equilibrium state breaks easily even by a very small stimulus or minor external disturbance, so the object easily transits to a more stable state. That is to say, if a small piece of the material is put into a supercooled liquid, or if the liquid is abject to impact on a sudden, it starts being solidified immediately and temperature of the liquid is raised to a freezing point, maintaining a stable equilibrium state at the temperature.

In general, an electrostatic atmosphere is created in a refrigerator, and meats and fishes are thawed therein at a temperature below zero. Besides meats and fishes, fruits are also kept fresh in the refrigerator.

Such technology uses the supercooling phenomenon. According to the supercooling phenomenon, a molten object or a solid in an equilibrium state does not go through the phase change even at temperatures below a phase transition temperature.

As a relevant technology, Korean Laid-Open Patent 2000-0011081 introduced a method and equipment for treating electrostatic field and electrode used therein.

FIG. 1 is a view illustrating a thawing and freshness-keeping apparatus in accordance with a prior art. A cool-keeping device 1 is formed of a heat insulation material 2 and an outer wall 5. A temperature regulator (not shown) is installed therein. A metal shelf 7 installed in the device 1 has a two-layer structure. Objects such as vegetables, meats and marine products that are to be thawed, kept fresh, or ripened are mounted on either layer. The metal shelf 7 is intentionally insulated from the bottom by an insulator 9. In addition, since a high voltage generator 3 can generate 0 to 5000 V of DC and AC voltages, the inside of the heat insulation material 2 is covered with an insulation plate 2a such as vinyl chloride. A high voltage cable 4 for outputting the voltage of the high voltage generator 3 is connected to the metal shelf 7 through the outer wall 5 and the heat insulation material 2.

When a user opens a door 6 installed at the front of the cool-keeping device 1, a safety switch 13 (not shown; refer to FIG. 2) is off to block the output from the high voltage generator 3.

FIG. 2 is a circuit view illustrating a circuit configuration of the high voltage generator 3. 100 V AC is supplied to a primary side of a voltage adjustment transformer 15. Reference numeral 11 denotes a power lamp and 19 denotes an operation state lamp. When the door 6 is closed and the safety switch 13 is on, a relay 14 is operated. This operation state is displayed by a relay operation lamp 12. Relay contact points 14a, 14b and 14c are closed the to the operation of the relay 14, and 100 V AC is applied to the primary side of the voltage adjustment transformer 15.

The applied voltage is adjusted by an adjustment knob 15a on a secondary side of the voltage adjustment transformer 15, and the adjusted voltage value is displayed on a voltmeter. The adjustment knob 15a is connected to a primary side of a boosting transformer 17 on the secondary side of the voltage adjustment transformer 15. The boosting transformer 17 boosts a voltage at a rate of 1:50. For example, when 60 V input voltage is applied, it is boosted to 3000 V.

One end $O_1$ of the secondary side output of the boosting transformer 17 is connected to the metal shelf 7 that is insulated from the cool-keeping device 1 through the high voltage cable 4, and the other end $O_2$ of the output is earthed. In addition, since the outer wall 5 is earthed, even though the user touches the alter wall 5 of the cool-keeping device 1, he or she will not get an electric shock. Meanwhile, in FIG. 1, when the metal shelf 7 is exposed in the device 1, it needs to be maintained in an insulated state, and thus needs to be spaced apart from the wall of the device 1 (the air serves to insulate). Moreover, when an object 8 protrudes from the metal shelf 7 to contact the wall of the device 1, the current flows to the ground through the wall of the device 1. Thus, by attaching the insulation plate 2a to the inner wall, drop of the applied voltage can be prevented. Further, although the metal shelf 7 in the device 1 is not exposed but covered with vinyl chloride, the entire device 1 is under an electric field.

In the prior art, an electric field or magnetic field is applied to a refrigerated stored item so that the item can enter a supercooled state. That is, a complex device for generating an electric field or magnetic field has to be provided to keep the stored item in the supercooled state. Unfortunately, this process takes a lot of power, and the device also mist have a safety device (e.g., an electric field or magnetic field shielding mechanism, a cut-off unit, etc.) additionally to protect a user from high electricity, especially when it is engaged in generation or cutting off the electric field or the magnetic field.

Interestingly though, none of devices in the prior art so far has used a technical configuration to regulate temperature of a supercooled stored item.

DISCLOSURE OF INVENTION

Technical Problem

An object of the present invention is to provide a supercooling apparatus which is capable of creating and maintain a stable supercooled state for stored items.

Another object of the present invention is to provide a supercooling apparatus which is capable of maintaining a supercooled state for stored items by regulating surface or surface temperature of the stored items, apart from refrigerating the stored items.

A further object of the present invention is to provide a supercooling apparatus which is capable of maintaining a supercooled state for stored items with simpler configuration components and lower power consumption than the prior art.

A still further object of the present invention is to provide a supercooling apparatus which can more reliably prevent the production of freezing nucleus in a supercooled stored item.

A still further object of the present invention is to provide a supercooling apparatus which can directly control a storage temperature range of stored items by regulating temperature of the stored items in supercooled state.

A still further object of the present invention is to provide a supercooling apparatus which sets a storage temperature range according to user input or depending on items being stored in a cooling space where a cooling process is invariably performed.

Technical Solution

In order to achieve the above-described objects of the invention, there is provided a supercooling apparatus, comprising: a storage space for receiving liquid or a stored item containing liquid; a cooling means for cooling the liquid, the stored item, or the storage space to a temperature below zero; and a temperature regulating means for applying a controlled amount of energy to the liquid, to surface of the stored item, or to gas above the surface, thereby regulating a temperature of the liquid or the stored item below a maximum ice crystal formation temperature zone of the liquid or the stored item. Therefore, the supercooling apparatus can control a supercooling temperature that has the biggest influence on ecological preservation of liquid or a stored item.

According to another aspect of the present invention, the temperature regulating means sets a temperature of the liquid, a temperature at the surface of the stored item, or a temperature of the gas above the surface higher than the maximum ice crystal formation temperature zone of the liquid or the stored item, such that the liquid or the stored item stays in supercooled state even at temperatures below a phase transition temperature. Therefore, a supercooled state can stably be maintained.

According to a further aspect of the present invention, the supercooling apparatus further comprises an blocking member for blocking a temperature rise by the energy, thereby allowing the cooling means to continuously perform a cooling operation on the liquid or the stored item. Therefore, energy and cooling efficiency are maintained.

According to a still further aspect of the present invention, the temperature regulating means controls an amount of energy input, by using a proportional relationship between the amount of energy input and the temperature of the liquid or the stored item in supercooled state. That is, it is now possible to directly control the temperature of the liquid or the stored item in supercooled state.

According to a still further aspect of the present invention, the temperature regulating means comprises an energy control unit which includes a sensing unit for detecting a temperature of the liquid or the stored item, so as to control an amount of energy input depending on a detected temperature of the liquid or the stored item and to thereby maintain a predetermined temperature of the liquid or the stored item.

According to a still further aspect of the present invention, the cooling means variably sets a cooling temperature.

According to a still further aspect of the present invention, the supercooling apparatus further comprises a temperature setting unit for allowing a user to set a temperature of the liquid or the stored item.

According to a still further aspect of the present invention, the temperature regulating means sets an amount of energy input based on the set temperature of the liquid or the stored item and applies energy of the set amount.

According to a still further aspect of the present invention, the temperature regulating means comprises an energy control unit which includes a sensing unit for detecting a temperature of the liquid or the stored item, so as to control an amount of energy input depending on a detected temperature of the liquid or the stored item and to thereby maintain a user input temperature of the liquid or the stored item.

According to a still further aspect of the present invention, the temperature regulating means applies heat energy to the liquid, the surface of the stored item, or the gas above the surface, or applying an ultrasonic energy to the liquid or the surface of the stored item.

According to a still further aspect of the present invention, a portion of the container in contact with the gas is insulated.

According to a still further aspect of the present invention, the supercooling apparatus further comprises a checking means for checking at least one of a kind of the liquid or the stored item, a volume of the liquid or the stored item, and a mass of the liquid or the stored item, and the temperature regulating means performs temperature regulation according to a checking result provided from the checking means.

Advantageous Effects

The supercooling apparatus in accordance with the present invention can create and maintain a supercooled state for stored items in a stable manner, so that the stored items can stay fresh and in high quality over a long period of time.

The supercooling apparatus in accordance with the present invention can maintain a supercooled state for stored items by regulating surface or surface temperature of the stored items, apart from refrigerating the stored items. That is, a supercooled state can be created and maintained merely by controlling temperature.

The supercooling apparatus in accordance with the present invention features improved productivity and efficiency by maintaining a supercooled state for stored items with simpler configuration components and lower power consumption than the prior art.

The supercooling apparatus in accordance with the present invention can more reliably prevent the production of freezing nucleus in a supercooled stored item and, simultaneously, control temperature of the supercooled stored item, thereby achieving a direct control over the keeping condition of the stored item.

The supercooling apparatus in accordance with the present invention has a direct control on a storage temperature range of stored items by regulating temperature of the stored items in supercooled state. In this way, the supercooling apparatus directly controls on the quality maintenance of the stored items and guarantees high quality of the stored items over a long period of time.

The supercooling apparatus in accordance with the present invention sets a storage temperature range according to user input or depending on items being stored in a cooling space where a cooling process is invariably performed, so that it can control temperature of the supercooled state merely by regulating temperature through energy input.

MODE FOR THE INVENTION

Hereinafter, preferred embodiments of the present invention will be described in detail with reference to the accompanying drawings.

Figure 1:
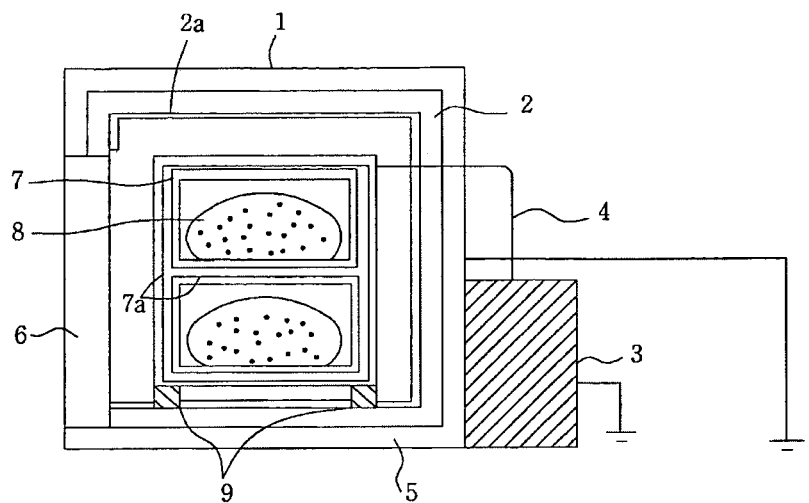
FIG. 1 is a view illustrating a thawing and freshness keeping apparatus in accordance with a prior art.
Figure 2:
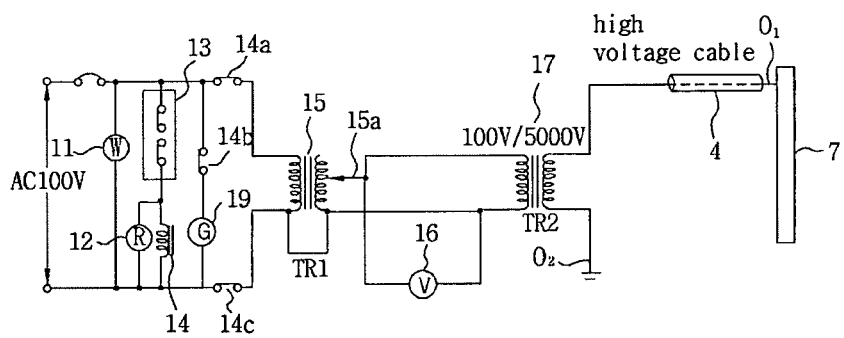
FIG. 2 is a circuit view illustrating a circuit configuration of a high voltage generator (3).
Figure 3:
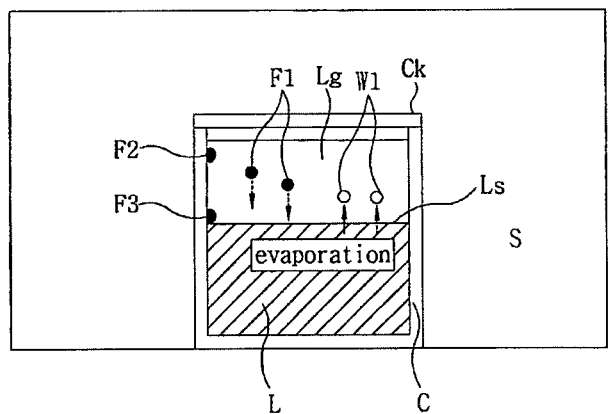
FIG. 3 is a view illustrating a process of forming freezing nuclei in liquid being cooled.

FIG. 3 is a view illustrating a process of forming freezing nuclei in liquid being cooled. As is shown in FIG. 3, a container C containing a liquid L is refrigerated in a cooling space S.

It is assumed that a cooling temperature inside the cooling space S falls from a normal temperature below 0° C. (a phase transition temperature of water) or below a phase transition temperature of the liquid L. While being cooled, the water or liquid L is intended to stay in a supercooled state even below a maximum ice crystal formation temperature zone (−1 to −5° C.) of water forming a maximum amount of ice crystals, or even below a maximum ice crystals formation temperature zone of the liquid L.

Meanwhile, the liquid L evaporates during the cooling process, so that vapor W1 flows into a gas (or space) Lg in the container C. In a case where a lid Ck is on the container C, the gas Lg may be over-saturated the to the evaporated vapor W1. In this embodiment, the lid Ck is included in the container C as an option. The container C with the lid Ck can prevent the cool air from being introduced directly from the cooling space S, or prevent the temperature of the surface Ls of the liquid L or the gas Lg on the surface Ls of the liquid L from being lowered by the cool air.

When the cooling temperature reaches or exceeds the maximum ice crystal formation temperature zone of the liquid L, the liquid L forms freezing nuclei F1 in the gas Lg or freezing nuclei F2 on the inner wall of the container C. In addition, condensation may occur in a contact portion of the surface Ls of the liquid L and the inner wall of the container C (almost the cooling temperature inside the cooling space S), so that the condensed liquid L forms freezing nuclei F3.

For example, when the freezing nuclei F1 in the gas Lg pass through the surface Ls of the liquid L and infiltrate into the liquid L, the liquid L is released from the supercooled state and freezes.

For another example, when the freezing nuclei F3 are brought into contact with the surface Ls of the liquid L, the liquid L is released from the supercooled state and freezes.

As described above, according to the process of forming the freezing nuclei F1 to F3, when the liquid L is kept below the maximum ice crystal formation temperature zone thereof, since the vapor W1 evaporated from the liquid L and positioned on the surface Ls of the liquid L and the inner wall of the container C adjacent to the surface Ls of the liquid L freezes, the liquid L is released from the supercooled state.

Figure 4:
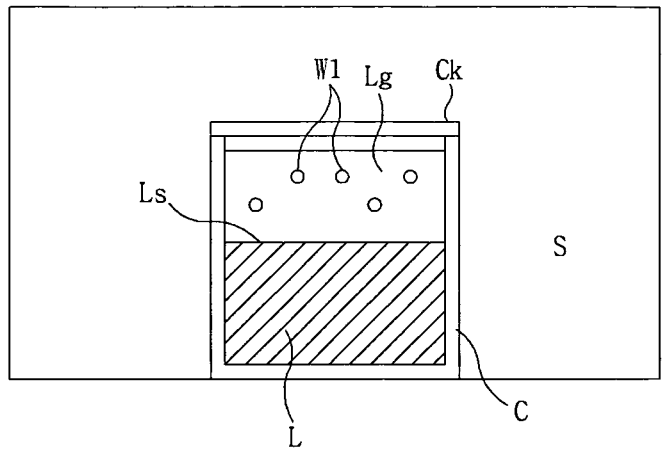
FIG. 4 is a view illustrating a process of preventing the formation of freezing nuclei, which is applied to a supercooling apparatus in accordance with the present invention.

FIG. 4 is a view illustrating a process of preventing the formation of freezing nuclei, which is applied to an apparatus for supercooling according to the present invention.

In FIG. 4, to prevent the vapor W1 in the gas Lg from freezing, i.e. to continuously maintain the vapor W1, a temperature of the gas Lg or the surface Ls of the liquid L is set up higher than the maximum ice crystal formation temperature zone of the liquid L, more preferably, the phase transition temperature of the liquid L. Moreover, in order to prevent the surface Ls of the liquid L brought into contact with the inner wall of the container C from being frozen, the temperature of the surface Ls of the liquid L is set up higher than the maximum ice crystal formation temperature zone of the liquid L, more preferably, the phase transition temperature of the liquid L.

Accordingly, the liquid L in the container C stays in the supercooled state at temperatures even below the phase transition temperature or the maximum ice crystal formation temperature zone thereof.

While the process in FIG. 3 and FIG. 4 explained with focus on the liquid L, it can also be applied to a stored item containing liquid to continuously keep the liquid in the stored item in a supercooled state at temperatures below the phase transition temperature, so that the stored item may stay fresh over a long period of time.

The energy that is applied to the present invention may take diverse forms, such as, heat energy, electric or magnetic energy, ultrasonic energy, light energy, and so on.

Moreover, an amount of energy (i.e. magnitude or intensity) that is applied to the gas Lg on the surface of the liquid L or to the surface Ls of the liquid L is adjusted to control the temperature of the entire L (average temperature of the liquid L). Here, the energy is not directly applied to the liquid L underneath the surface Ls, but the regular refrigeration process that takes place in the cooling space S is applied there. However, the gas Lg on the surface Ls of the liquid L or the surface Ls of the liquid L itself is subject to an increasing energy input, which in turn causes heat transfer such as convention in the liquid L. Therefore, the gas Lg on the surface Ls of the liquid L or the surface Ls of the liquid L can remain at temperatures higher than the maximum icy crystal formation temperature zone of the liquid L or above the phase transition temperature, yet, simultaneously, the (average) temperature of the liquid L can either be raised or lowered according to energy input.

Figure 5:
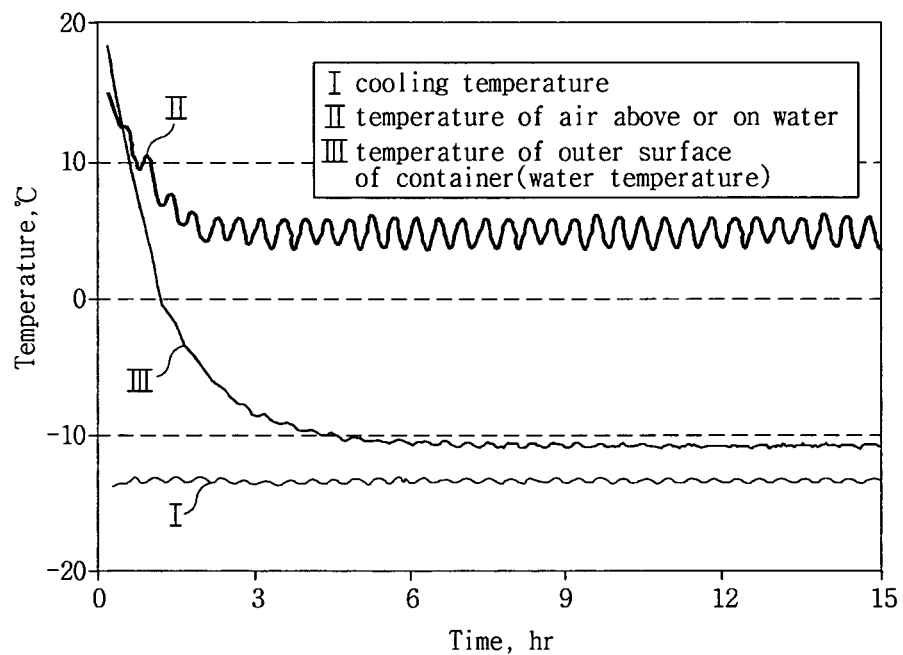
FIG. 5 is a graph showing a supercooled state of water in result of the process of FIG. 4.

FIG. 5 is a graph showing a supercooled state of water under the process in FIG. 4. Provided that the liquid L is water, temperatures were measured by applying the principle of FIG. 4 thereto.

Referring to FIG. 5, I indicates a cooling temperature curve for the cooling space S, II indicates a temperature curve for the gas (air) Lg above or on the surface of water in the container C, and III indicates a temperature curve for the outer surface of the container C, which is substantially identical to temperature of water in the container C.

Still referring to FIG. 5, in a case where the cooling temperature maintains at about −13 to −14° C. (see I), when the temperature of the gas Lg above or on the surface of water in the container C maintains at about 4 to 6° C. higher than the maximum ice crystal formation temperature zone of water, although the temperature of water in the container C maintains at about −11° C. lower than the maximum ice crystal formation temperature zone of water, water is stably maintained in a supercooled state which is a liquid state over a long period of time.

Also, if the temperature of the gas Lg on the surface of water in the container C is raised and maintained at abort 10° C., the water temperature can be adjusted to about −9° C. Of course, in this embodiment, the adjustment range of temperature can vary depending on the amount of water and the amount of gas Lg. In other words, it is possible to adjust the amount of energy input after checking how much water or gas Lg is in supercooled state. Also, water temperature can also be sensed to increase/decrease the amount of energy input used for adjustment of the temperature of gas Lg, or the temperature of gas Lg can be sensed to increase/decrease the amount of energy input. Needless to say, regulating the cooling temperature inside the cooling space S is another way to adjust temperature of a stored item such as water in supercooled state. In addition, the cooling temperature of the cooling space S and the amount of energy input can be regulated concurrently to adjust temperature of a stored item such as water in supercooled state.

The following now explains another embodiment of a supercooling apparatus in accordance with the present invention, which is capable of preventing the formation of freezing nuclei and adjusting temperature of a stored item in supercooled state as in FIG. 4.

Figure 6:
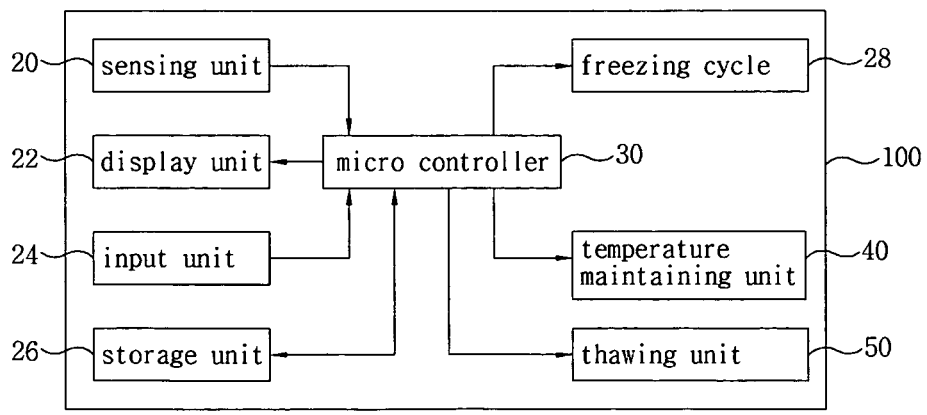
FIG. 6 is a view illustrating a supercooling apparatus in accordance with an embodiment of the present invention.

FIG. 6 is a schematic view of a supercooling apparatus in accordance with the present invention. A supercooling apparatus 100 includes a sensing unit 20 which senses state of liquid (e.g., temperature, whether the supercooled state is released, etc.) stored in a storage space or a container, a display unit 22 which displays an operation mode of the supercooling apparatus 100, an input unit 24 through which a user inputs a desired refrigeration level (setting a desired supercooling temperature for a stored item or setting a desired cooling temperature), information about the liquid, etc., a storage unit 26 which stores information about the storage space or the state of the liquid, the refrigeration level, the information about the liquid, etc., a freezing cycle 28 which cools the storage space, a temperature maintaining unit 40 which regulates temperature at the surface of the liquid or temperature of gas above the surface, a thawing unit 50 which thaws liquid or a stored item in a container during the freezing process of the liquid or the stored item, and micro controller 30 which controls a freezing or cooling process of the supercooling apparatus 100, and maintains liquid (which exhibits the phenomenon of supercooling) in supercooled state while regulating temperature of the liquid in supercooled state at the same time. FIG. 6 does not show a power supply unit which supplies power to the components described above because any one who is skilled in the art to which the present invention pertains is already familiar with the power supply, so elaboration on the power supply will not be provided, either.

In detail, the sensing unit 20 senses or stores sensed results on conditions of the storage space, state of the liquid stored in the storage space, temperature at the surface of the liquid or temperature of gas above the surface, temperature of the liquid, etc., and provides the information to the micro controller 30. As an example, the sensing unit 20 may take the form of a thermometer to store information on volume of the storage space as the state of the storage space or detect temperature of the storage space of the liquid, temperature at the surface of the liquid, temperature of the gas above the surface, or temperature of the liquid, or one of a durometer, a weight scale, an optical sensor (or laser sensor) or a pressure sensor to check whether liquid is present in the storage space or whether the liquid is released from its supercooled state, or to check kind, volume, and mass of the liquid.

Especially when detecting temperature of the liquid, one thing should be noted that temperature in the lower area, at the central area, and in the upper area (including the surface) of the container may differ from each other. Since a cooling operation takes place outside the container and energy is applied to the surface of the liquid or the gas above the surface, the liquid tries to create a uniform distribution of temperature by heat transfer such as convention, but a little of temperature variation still exists nevertheless. Therefore, it is preferable to measure temperature at the central area of the liquid, or average temperatures of different areas of the liquid.

The display unit 22 basically displays freezing and refrigeration temperatures, service mode of a dispenser, whether the supercooling mode is being executed, whether liquid was released from the supercooled state (i.e. the liquid is now freezing), and so on. In addition, the display unit 22 displays temperature of a stored item such as liquid which is currently in supercooled state.

The input unit 24 is used by a user not only to set temperature for freezing and refrigeration control in general and select the service mode of the dispenser (ice cubes, water, etc.), hit also to give a command for execution of a supercooling mode on a storage space or stored item(s) and set a supercooling temperature of liquid in supercooled state. Moreover, the user can input information about liquid, through the input unit 24, the information including kind of the liquid, maximum icy crystal formation temperature zone of the liquid, phase transition temperature of the liquid, mass of the liquid, volume of the liquid, and so on. A barcode reader or an RFID reader may be used as the input unit, and the liquid information from reading is then provided to the micro controller 30. Further, the input unit 24 is connected directly to the temperature maintaining unit 40 (or through the micro controller 30), thereby enabling the user to input an operation instruction for the temperature maintaining unit 40.

The input unit 24 also receives a temperature instruction (supercooling temperature) from the user for a stored item such as liquid to stay in supercooled state. For instance, the instruction may be a specific temperature like −8° C. or −10° C., or a supercooling level like high, medium, and low.

The storage unit 26 stores condition of the storage space or liquid state (temperature) that is detected by the sensing unit 20 or the input unit 24, temperature at the surface of the liquid or temperature of the gas above the surface, cooling level (supercooling temperature, cooling temperature by the freezing cycle 28, and so on), information about the liquid, etc. Also, the storage unit 26 stores information about a maximum ice crystal formation temperature zone according to the kind of liquid. Further, the storage unit 26 stores optimum supercooling temperatures based on information about stored items such as liquid, the temperatures of which are read by the micro controller 30 and used for the control of a supercooling temperature range based on it.

Next, the freezing cycle 28 adapts direct cooling mode or indirect cooling mode, depending on how stored items are going to be cooled. Either mode can be adapted to the supercooling apparatus 100.

The temperature maintaining unit 40 is an energy input means in order to set temperature at the surface of liquid or temperature of gas around/on the surface of the liquid higher than the maximum icy crystal formation temperature zone of the liquid, more preferably, the phase transition temperature of the liquid, thereby preventing the formation of ice crystals in gas inside the container and/or the contact portion between the inner wall of the container and the surface of the liquid. Examples of energy form the temperature-regulation unit 40 uses include heat energy, ultrasonic energy, light energy, and so on. Meanwhile, the temperature maintaining unit 40 can block the application of an energy, thereby adjusting an amount of energy input being applied under the control of the micro controller 30 or the like.

Optionally, the temperature maintaining unit 40 may use a constant temperature material such as a filler or an anti-freeze coolant, instead of applying an energy as discussed earlier, so as to allow the cooling operation by the freezing cycle 28 to be executed continuously at temperatures higher than the maximum ice crystal formation temperature zone of the liquid or higher than the phase transition temperature of the liquid.

The thawing unit 50 applies heat energy, under the control of the micro controller 30, to a stored item or liquid that has been frozen. The thawing unit 50 is in heater or coil form and generates heat quickly.

The micro controller 30 is involved in the refrigeration and freeze control in general, and controls a supercooling mode according to the present invention to be executed.

The micro controller 30 controls the freezing cycle 28 to cool the storage space. In case of regular cooling it sets a cooling temperature range between −18 and −22° C., while in case of supercooling it sets the cooling temperature equal to the normal cooling temperature or below a maximum ice crystal formation temperature zone of liquid to be supercooled. The micro controller 30 can vary a cooling temperature inside the storage space by setting the cooling temperature according to a user input value obtained from the input unit 24 or according to information about the liquid.

The micro controller 30 obtains the information about the liquid from the sensing unit 20 or the input unit 24, and checks whether the cooling temperature inside the storage space is at a temperature range corresponding to the obtained information or higher than the maximum ice crystal formation temperature zone of the liquid, to thereby assure that a cooling operation is carried out in an adequate temperature range. For instance, if kind of the liquid is identified, the micro controller 30 either acquires a maximum ice crystal formation temperature zone corresponding to the liquid kind, or reads a pre-stored maximum ice crystal formation temperature zone from the storage unit 26.

As liquid inside the container in the storage space gets cooled, the sensing unit 20 detects internal temperature of the storage space provided by the freezing cycle 28, and before the detected temperature reaches the maximum ice crystal formation temperature zone of the liquid the micro controller 30 actuates the temperature maintaining unit 40 to initiate its operation which involves raising the temperature at the surface of the liquid or the temperature of gas above the surface higher than the maximum ice crystal formation temperature zone of the liquid. If the internal temperature of the storage space is below the maximum ice crystal formation temperature zone of the liquid that is kept in the container, freezing nuclei are highly likely to form at the surface of the liquid and in the gas above the surface, so it is important to make sure the temperature maintaining unit 40 is actuated before that happens. More preferably, the temperature maintaining unit 40 is actuated while the internal temperature of the storage space is yet above the phase transition temperature of the liquid, so as to markedly reduce possible formation of freezing nuclei.

In short, the micro controller 30 lets the liquid stay in a stable supercooled state by ensuring the cooling temperature inside the storage space to be lower than the maximum ice crystal formation temperature zone of the liquid, and by ensuring the temperature at the surface of the liquid or the temperature of gas above the surface to be higher than the maximum ice crystal formation temperature zone of the liquid.

While controlling the temperature maintaining unit 40 to maintain a supercooled state for a stored item such as liquid, the micro controller 30 can also increase or decrease temperature of the stored item such as liquid in supercooled state. For instance, when the cooling temperature inside the storage space is lower to −22° C. the amount of energy applied per hair is the same as the amount of energy applied when the cooling temperature inside the storage space was at −18° C., while a supercooling temperature of a stored item such as liquid will be lowered. Otherwise, the supercooling temperature of the stored item will increase.

Under the circumstance where a cooling temperature is fixed, the micro controller 30 can raise or drop a supercooling temperature of a stored item such as liquid, as noted before, by increasing or decreasing the amount of energy input to the liquid, etc.

Also, as discussed above, the micro controller 30 controls the freezing cycle 28 to regulate a supercooling temperature of a stored item, or controls the temperature maintaining unit 40 to let the stored item stay in supercooled state, or it can control the freezing cycle 28 and the temperature maintaining unit 40 concurrently to regulate the supercooling temperature of the stored item.

The following now explains how a supercooling temperature is set for a stored item, in accordance with the temperature regulation process described above.

First, the micro controller 30 may control the temperature maintaining unit 40 or the freezing cycle 28, based on a user input supercooling temperature for a stored item obtained from the input unit 24.

In addition, the micro controller 30 may control the temperature maintaining unit 40 or the freezing cycle 28, based on information (kind, mass, volume, etc.) about the stored item obtained from the sensing unit 20, the input unit 24, or the storage unit 26, so as to maintain an optimal supercooling temperature for the stored item. Since a user is not always aware of characteristics of every stored item in supercooled state, the micro controller 30 has an automatic sensing function to be able to keep the stored items at an optimum temperature.

Sometimes, a supercooled liquid is released from the supercooled state the to an external shock or the like, and, as a result, a freezing (slush) process proceeds in a container. When this happens, the micro controller 30 activates the operation of the temperature maintaining unit 40 to keep temperature at the surface of liquid or temperature of gas on the surface above a phase transition temperature of the liquid, thereby melting the frozen liquid. Whether the liquid is frozen is detected by the sensing unit 20, for example, based on a change in detected temperatures (e.g., in case of water, a sharp decrease in temperature from 0° C. to −5° C. is detected).

FIG. 7 through FIG. 10 show different embodiments of the temperature maintaining unit. In these embodiments, a temperature maintaining unit includes a first sensing unit 20a for sensing temperature inside a cooling space S, a second sensing unit 20b attached to an outer face of a container C to sense temperature of liquid L, and a third sensing unit 20c attached to an inner face of the container C to sense temperature of gas above the surface of the liquid L. In particular, the second sensing unit 20b is attached to the outer face of the container C correspondingly to the central area of the liquid. Meanwhile, the first sensing unit 20a may be attached near the surface of the liquid L, so as to detect any direct influence of the temperature of gas Lg over the surface Ls on the liquid L.

temperature maintaining unit 40 in FIGS. 7 through 10 each are in form of a heat generator that can forcibly increase the temperature at the surface of the liquid, the temperature of gas above the surface, or the temperature of the container C.

Figure 7:
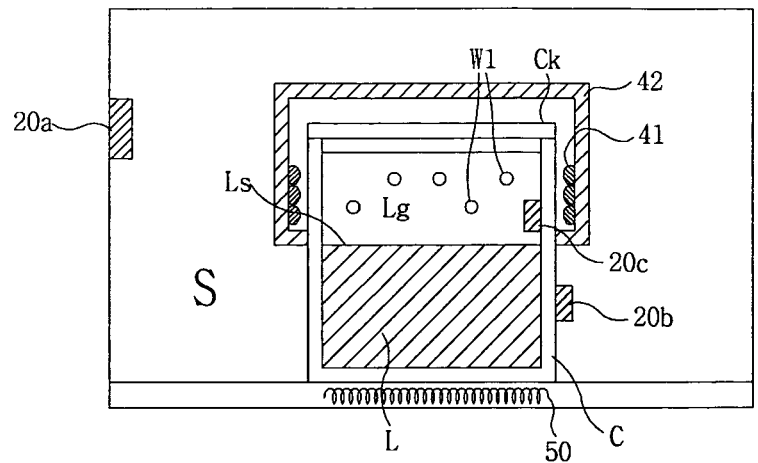
FIG. 7 through FIG. 10 each show an embodiment of a temperature maintaining unit.

In detail, a temperature maintaining unit 40 in FIG. 7 includes a heater 41 which generates heat by an applied power, and a heat blocking unit 42 to minimize influences of the heat generated by the heater 41 on the cooling space S by blocking a direct heat transfer into the cooling space S.

The heater 41, as shown in FIG. 7, is settled on an inner lateral face of the heat blocking unit 42, or may contact at least part of a container C or a lid Cc, to generate heat. To this end, the heater 41 may be formed of a thermo-coil.

The heat blocking unit 42 fixes the heater 41 and is attached to the container C or the lid Cc to allow heat from the heater 41 to transfer only to the surface Ls of liquid L, to the gas Lg above the surface Ls, or to the container C. Particularly, to limit the range of heat transfer, the heat blocking unit 42 surrounds the heater 41 and its bottom is located above the surface Ls of the liquid L or at the level of the surface Ls (e.g., close to the surface Ls) to be the lowest. In result, heat from the heater 41 cannot reach directly to the central or bottom area of the liquid L.

In addition to the heat blocking unit 42, the lid Ck of the container C serves to prevent heat energy that is applied into the gas Lg or to the surface Ls of the liquid L from being exhausted by a chill inside the cooling space S, and helps the gas Lg and the surface Ls of the liquid L retain a certain temperature.

The micro controller 30 (see FIG. 6) sets, based on temperatures detected by the first through third sensing unit 20a through 20c, the temperature at the surface Ls of the liquid or the temperature of gas Lg over the surface Ls higher than a maximum ice crystal formation temperature zone or higher than a phase transition temperature of the liquid L, by actuating the freezing cycle 28 (see FIG. 6) and actuating/controlling the operation of the heater 41 as the temperature maintaining unit 40 (turning on/off the heater 41). In this way, the liquid L is continuously cooled off to stay in supercooled state at temperatures even below its maximum ice crystal formation temperature zone.

Also, for temperature regulation of the liquid L, the micro controller 30 controls the temperature maintaining unit 40 or the freezing cycle 28 according to a detected temperature by the second sensing unit 20b, or controls the temperature maintaining unit 40 or the freezing cycle 28 according to a detected temperature by the third sensing unit 20c.

Further, the thawing unit 50 (see FIG. 6) is seated on one side of the cooling space S, more preferably, close to a place where the container is located, so that liquid or a stored item can quickly melt under the control of the micro controller 30.

Figure 8:
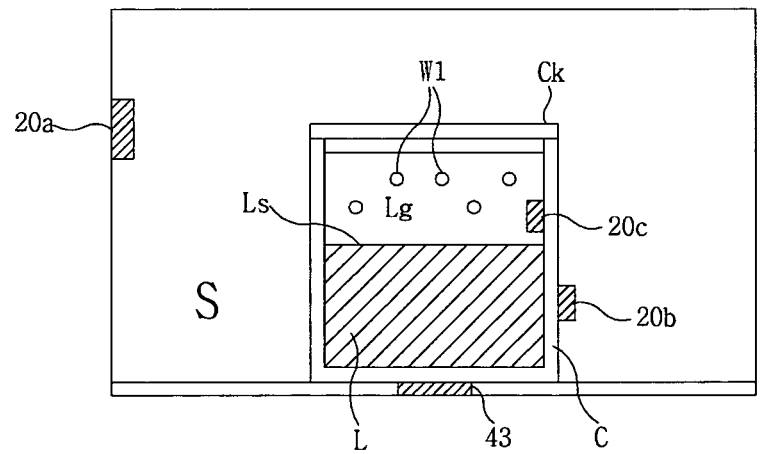

FIG. 8 illustrates a temperature maintaining unit 40 in form of an ultrasonic oscillator 43 settled at the bottom face on the outside of a container C. The ultrasonic oscillator 43 generates ultrasonic waves by an applied power and transfers them to the container C, liquid L and gas Lg, respectively, thereby achieving heat generation at the bottom face on the inside of the container C of a different medium and at the surface Ls of the liquid L. In particular, heating value at the surface Ls of the liquid L is noticeably large, compared with a small heating value at the bottom face on the inside of the container C. As such, temperature at the surface Ls of the liquid and temperature of gas Lg over the surface Ls increase.

Optionally, the ultrasonic oscillator 43 may be attached to the inner bottom side of the container C to achieve heat generation only at the surface Ls of the liquid L.

The micro controller 30 (see FIG. 6) carries out a supercooling operation by controlling power ON/OFF state of the ultrasonic oscillator 43, so as to maintain a detected temperature by the third sensing unit 20c is higher than a maximum ice crystal formation temperature zone of the liquid L or higher than a phase transition temperature of the liquid L.

Also, the micro controller 30 controls the ultrasonic oscillator 43 or the freezing cycle 28 (see FIG. 6) to increase or decrease a supercooling temperature of a stored item as noted before.

Figure 9:
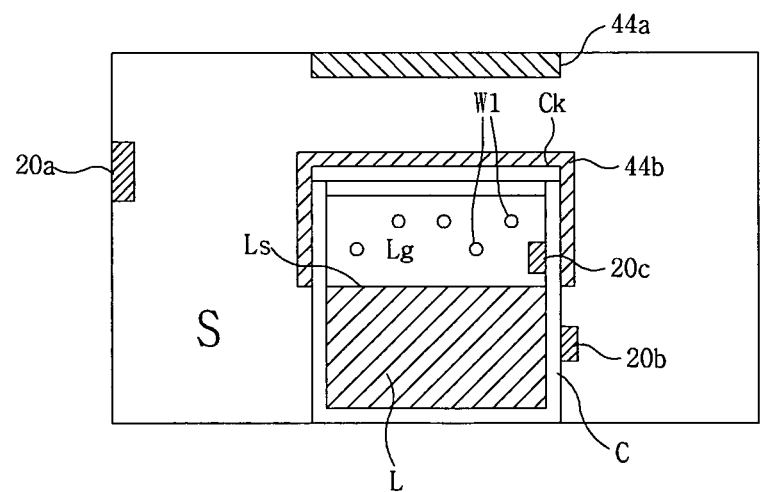

FIG. 9 illustrates a temperature maintaining unit 40 which includes a working coil 44a generating an electromagnetic force by an applied power, and a metal part 44b positioned on the outside of the container C above a container C or above surface Ls of liquid L to generate heat by the electromagnetic force from the working coil 44a. That is, the working coil 44a and the metal part 44b are exothermic devices using induction effects.

As shown in FIG. 9, the working coil 44a is fixedly settled beneath the top face of a cooling space S, and the metal part 44b with a predetermined distance away from the working coil 44a covers a lid Ck and part of sides of the container C.

In correspondence to the heat blocking unit 42 in FIG. 7, the covering area of the metal part 44b is located above surface Ls of liquid L or at the level of the surface Ls to be the lowest.

Similar to previous embodiments, the micro controller 30 (see FIG. 6) keeps a stored item in supercooled state and regulates a supercooling temperature, in use of heat induced by an electromagnetic force between the working coil 44a and the metal part 44b and through the control over the freezing cycle 28.

Figure 10:
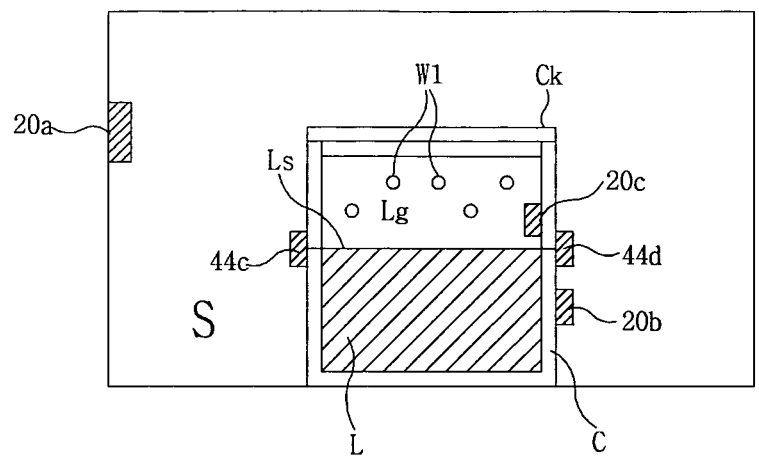

FIG. 10 illustrates a temperature maintaining unit 40 including metal electrodes 44c and 44d that are attached at locations along the sides of a container C to correspond to surface of liquid L, and a voltage supply unit (not shown) for applying a high-voltage pulse or a high voltage. Here, the container C is preferably formed of a non-conductor, through which no current flows.

When the voltage supply unit applies a voltage or a pulse voltage to the metal electrodes 44c and 44d, the voltage or the pulse voltage flows through the surface Ls of the liquid L or near the surface Ls. In effect, most of the applied voltage or pulse voltage flows through the surface Ls of the liquid L or near the surface Ls. Because of the application of an electric current, the temperature at the surface Ls of the liquid L or the temperature near the surface Ls is forcibly increased, while an area underneath the surface Ls of the liquid L is continuously cooled off. Uniform temperature distribution in result of convention keeps the liquid L below its phase transition temperature or below its maximum ice crystal formation temperature zone. As in FIG. 4, therefore, the temperature rise occurs only in a desired area (the surface Ls of the liquid L or the area above the surface Ls). Accordingly, a stored item can stay in supercooled state, and a supercooling temperature can be increased or decreased as desired.

To get benefit from the application of an electric current, the metal electrodes 44c and 44d should be arranged along the sides of the container C correspondingly to the surface Ls of the liquid L or near the surface Ls of the liquid L. Since a water level of the liquid L can vary any time, it is preferable to make the metal electrodes 44c and 44d movably attached in the vertical direction along the sides of the container C.

Besides the energy forms mentioned above, the temperature maintaining unit 40 may further include an infrared radiator on the top of the container C or on the inside of a lid Ck, so as to forcibly increase the temperature at the surface Ls of the liquid L or the temperature of gas Lg above the surface Ls.

Figure 11:
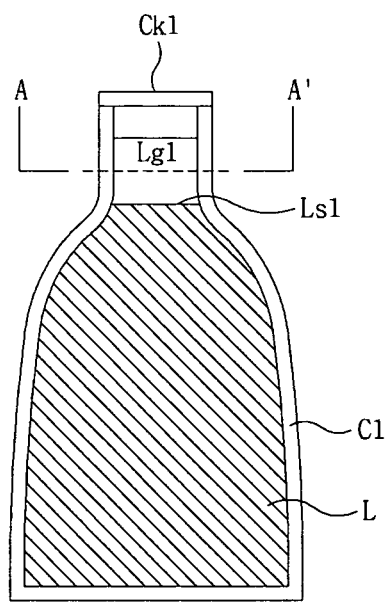
FIG. 11 and FIG. 12 each show an embodiment of a container adapted to a supercooling apparatus in accordance with the present invention.
Figure 12:
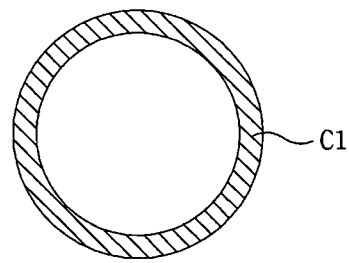

FIG. 11 and FIG. 12 each illustrate an embodiment of a container adapted to a supercooling apparatus in accordance with the present invention.

A container C shown in FIG. 11, as compared with the containers C in FIGS. 3 through 10, has a small inlet for liquid L, so surface Ls1 of the liquid L is relatively small or gas Lg1 above the surface Ls1 has a small volume. Consequently, a relatively small amount of vapor is evaporated from the small surface Ls1 of the liquid L, and a contact area between the surface Ls1 and the container C is substantially reduced. This structural feature is advantageous for maintaining supercooling conditions in the supercooling apparatus of FIG. 4 discussed earlier.

For the container C1 of this embodiment, at least the surface Ls1 of the liquid L or the area corresponding to gas Lg1 above the surface Ls1 are insulated. In this manner, a chill from a cooling space S cannot have direct influences on a temperature control function of the temperature maintaining unit 40. As such, energy from the temperature maintaining unit 40 influences only the gas Lg1 and the liquid L.

Another feature of the container C1 in FIG. 11 is that an amount of energy input from the temperature maintaining unit 40 or a size of the temperature maintaining unit 40 can be reduced.

FIG. 12 illustrates another embodiment of a container adapted to a supercooling apparatus in accordance with the present invention, in which a cross-section of the container C1 with respect to line A-A' is either circular or rounded. As such, the temperature at a contact portion between surface Ls1 of liquid L and the container C1 is uniformly distributed.

The present invention has been described in detail with reference to the embodiments and the attached drawings. However, the scope of the present invention is not limited to the embodiments and the drawings, but defined by the appended claims.

The invention claimed is:

1. A supercooling apparatus, comprising:
   a storage space for receiving liquid or a stored item containing liquid;
   a cooling unit for cooling the liquid, the stored item, or the storage space to a temperature below zero centigrade; and
   a temperature maintaining unit for applying a controlled amount of energy to a surface of the liquid, to a surface of the stored item, or to a gas above the surface,
   wherein the temperature maintaining unit sets a temperature at the surface of the liquid, a temperature at the surface of the stored item, or a temperature of the gas above the surface higher than the maximum ice crystal formation temperature zone of the liquid or the stored item, such that the liquid or the stored item stays in a supercooled state even at temperatures below a phase transition temperature.

2. The supercooling apparatus of claim 1, further comprising:
   an isolating member for blocking a temperature rise by the energy, thereby allowing the cooling unit to continuously perform a cooling operation on the liquid or the stored item.

3. The supercooling apparatus of claim 1, wherein the temperature maintaining unit controls an amount of energy input, by using a proportional relationship between the amount of energy input and the temperature of the liquid or the stored item in supercooled state.

4. The supercooling apparatus of claim 1, further comprising an energy control unit which includes a sensing unit for detecting a temperature of the liquid or the stored item, so as to control an amount of energy input depending on a detected temperature of the liquid or the stored item and to thereby maintain a predetermined temperature of the liquid or the stored item.

5. The supercooling apparatus of claim 1, wherein the cooling unit variably sets a cooling temperature.

6. The supercooling apparatus of claim 1, further comprising:
   a temperature setting unit for allowing a user to set a temperature of the liquid or the stored item.

7. The supercooling apparatus of claim 6, wherein the temperature maintaining unit sets an amount of energy input based on the set temperature of the liquid or the stored item and applies energy of the set amount.

8. The supercooling apparatus of claim 6, further comprising an energy control unit which includes a sensing unit for detecting a temperature of the liquid or the stored item, so as to control an amount of energy input depending on a detected temperature of the liquid or the stored item and to thereby maintain a user input temperature of the liquid or the stored item.

9. The supercooling apparatus of claim 1, wherein the temperature maintaining unit applies heat energy to the liquid, the surface of the stored item, or the gas above the surface, or applying an ultrasonic energy to the liquid or the surface of the stored item.

10. The supercooling apparatus of claim 1, wherein a portion of the container in contact with the gas is insulated.

11. The supercooling apparatus of claim 1, further comprising:
    a checking unit for checking at least one of a kind of the liquid or the stored item, a volume of the liquid or the stored item, and a mass of the liquid or the stored item, and
    wherein the temperature maintaining unit performs temperature regulation according to a checking result provided from the checking unit.

12. The supercooling apparatus of claim 1, wherein the temperature maintaining unit applies heat energy to the liquid, the surface of the stored item, or the gas above the surface.

13. The supercooling apparatus of claim 12, further comprising a heat blocking unit allowing the heat energy from the temperature maintaining unit to transfer only to the surface of the liquid or to the gas above the surface to limit a range of heat transfer.

14. The supercooling apparatus of claim 13, wherein the heat blocking unit surrounds the temperature maintaining unit, and
    wherein a bottom of the heat blocking unit is located above the surface of the liquid or at a level of the surface of the liquid.

15. The supercooling apparatus of claim 1, further comprising a thawing unit seated close to the container, so that the liquid or the stored item can quickly melt.

16. The supercooling apparatus of claim 1, wherein the temperature maintaining unit includes:
    a working coil generating an electromagnetic force by an applied power; and
    a metal part positioned above surface of liquid or at the level of the surface of the liquid to generate heat by the electromagnetic force from the working coil.

17. The supercooling apparatus of claim 1, wherein the temperature maintaining unit includes:
    metal electrodes attached at locations corresponding to the surface of the liquid; and
    a voltage supply unit for applying a high-voltage pulse or a high voltage.

18. The supercooling apparatus of claim 17, wherein the metal electrodes are movably attached in a vertical direction along sides of the container.

* * * * *